(12) United States Patent
Britz et al.

(10) Patent No.: US 7,229,301 B2
(45) Date of Patent: Jun. 12, 2007

(54) MOTOR-SWITCH ARRANGEMENT FOR A HAND-HELD POWER TOOL

(75) Inventors: Rory Britz, Kaufering (DE); Thomas Hofbrucker, Mammendorf (DE); Rainer Ontl, Landsberg am Lech (DE); Valentin Keller, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/377,498

(22) Filed: Mar. 15, 2006

(65) Prior Publication Data

US 2006/0237207 A1    Oct. 26, 2006

(30) Foreign Application Priority Data

Apr. 25, 2005    (DE)    .................. 10 2005 019 197

(51) Int. Cl.
*H01R 29/00*    (2006.01)
(52) U.S. Cl. ...................................... 439/188; 439/218
(58) Field of Classification Search ................ 439/188, 439/218, 578
See application file for complete search history.

(56) References Cited

U.S. PATENT DOCUMENTS

| 5,018,983 | A | * | 5/1991 | Bittel et al. | ............... | 439/76.1 |
| 5,435,748 | A | * | 7/1995 | Abe | ........................ | 439/489 |
| 6,057,610 | A | * | 5/2000 | Nierescher | .................. | 307/72 |
| 2004/0029426 | A1 | * | 2/2004 | Lui et al. | .................... | 439/218 |
| 2006/0237207 | A1 | * | 10/2006 | Britz et al. | ................ | 173/217 |

* cited by examiner

*Primary Examiner*—James R. Harvey
(74) *Attorney, Agent, or Firm*—Abelman, Frayne, Schwab

(57) ABSTRACT

A motor-switch arrangement for a hand-held power tool includes a drive motor (12), an actuating switch (20) with a contact plug (24), and an adapter (44) arranged between the contact plug (24) and the drive motor (12) and having a plug connecter (46) cooperating with the counter-plug contact element (28) of the drive motor (12) for establishing a first electrical plug connection (30a) of the adapter (44), and a counter-plug connecter (48) electrically connected with the plug connecter (46) and cooperating with a plug contact element (26) of the contact plug (24) for establishing a second electrical plug connection (30b) of the adapter (44).

7 Claims, 5 Drawing Sheets

MOTOR-SWITCH ARRANGEMENT FOR A HAND-HELD POWER TOOL

BACKGROUND OF THE INVENTION

1. Field of the Invention

The present invention relates to a motor-switch arrangement for a hand-held power tool such as a drilling tool, screwdriving tool, chisel tool, saw, or grinding tool. The arrangement includes a drive motor and a switch for actuating the drive motor. The switch is electrically connected with a contact plug, fixedly or releasably, e.g., by a plug connection. The contact plug has plug contact means.

2. Description of the Prior Art

Such motor-switch arrangements, with which an electrical contact between the switch and the drive motor is provided by using a contact plug for establishing a plug connection, is used as an alternative to a loose wire connection to provide for simpler assembly. In addition, such plug connection can be so formed that they form a particularly stable connection and, thereby, prevent, during an operation, disturbances or breakdowns which may be caused by vibrations or blows.

German Publication DE 36 06 926 discloses an electrical hand-held tool in which all elements, which belong to the electrical switch region, are formed as separate module plug-in one beneath the other. There is also provided a bridge-forming contact element that is electrically connected with both, the switch and a stator disc of the drive motor by plug contacts.

With this motor-switch arrangement many elements, which belong to the electrical switch region can be pre-assembled. Therefore, the final assembly can be carried out at least partially automatically.

The drawback of the known motor-switch arrangement consists in that separate components need be exactly adapted to each other. In addition, it is necessary that the plug contact means of the drive motor is provided in an easily accessible position to enable its connection with bridge-forming contact element that serves as a contact plug.

When a power tool series with differently equipped types of the power tools is produced, it can occur that even with a slightly changed arrangement of the drive motor, either a completely different bridge-forming contact element should be provided or the entire plug connection should be relinquished.

Accordingly, an object of the present invention is to eliminate the above-discussed drawbacks during production of a power tool series with different types of power tools.

Another object of the present invention is to reduce manufacturing costs during production of a power tool series with different types of power tools.

SUMMARY OF THE INVENTION

These and other objects of the present invention, which will become apparent hereinafter, are achieved by providing an adapter which is arranged between the contact plug and the drive motor. The adapter is provided with a plug connecter that cooperates with the counter-plug contact means of the drive motor for establishing a first electrical plug connection of the adapter. The adapter further has a counter-plug connecter electrically connected, by conductors integrated in adapter or by wiring, with the plug connecter and cooperating with the plug contact means of the contact plug for establishing a second electrical plug connection of the adapter.

The adapter, which is described above, can be arranged, optionally between the contact plug of the switch and the drive motor. The adapter enables an electrical connection of the plug contact means of the contact plug with the counter-plug contact means of the drive motor of a power tool when the drive motor is aligned, in comparison with the drive motor of another power tool of the same series, in a different manner because of different equipment features such as, e.g., because of presence of attachment means for attaching, e.g., a dust absorber, and the drive motor cannot be directly connected with the contact plug. The adapter permits to use the same motor-switch arrangement for both power tools despite the fact that drive motors of the two power tools have different orientation. The use of the same motor-switch arrangement, the same parts, permits to noticeably reduce total costs of production and to reduce logistical expenses, which are associated with manufacturing of the power tools, upon production of different types of power tools of the same series of the power tools.

According to an advantageous embodiment of the present invention, the plug connecter of the adapter and the counter-plug contact means of the drive motor, which form the first electrical plug connection, and the counter-plug connecter of the adapter and the plug contact means of the contact plug, which form the second electrical plug connection, have, respectively, two flat plug elements and complementary formed, two flat plug element-receiving slots. The flat plug element-receiving slots can be formed, e.g., by metal sleeves or by two, arranged one over the other, in a somewhat Y-like shape, metal lamellas. In this way between both the adapter and the contact plug and the adapter and the drive motor a stable plug connection can be produced.

Advantageously, the first electrical plug connection and the second electrical plug connection define, respectively, mutually perpendicular first connection direction and second connection direction. In this way, the adapter can be used for connecting a contact plug with a motor pivoted with respect to the contact plug. At the same time, the adapter ensures an easy accessibility during establishing of the plug connections. With the adapter, e.g., it is possible to offset the first electrical plug connection relative to the second electrical plug connection by about 90%. This ensures mounting of the drive motor of the first power tool of the series transverse to the mounting of the drive motor of the other or second power tool of the same series. With mutually perpendicular connection directions, an easy assembly of both power tools is ensured.

According to a particularly advantageous embodiment of the present invention, the adapter is secured on the stator of the drive motor, whereby, the adapter can be mounted on the drive motor before the final assembly. This further simplifies the final assembly of the power tool.

Advantageously, there is provided between the adapter and the stator locking means which permits to clip the adapter or the drive motor. This, on one hand, enables a particularly easy mounting of the adapter on the drive motor before the final assembly and, on the other hand ensures a particular stable position of the adapter in the mounted condition.

Advantageously, the locking means has pivotal locking hooks provided on the adapter and locking receptacles provided on an outer surface of the stator and in which the locking hooks engage. Thereby, the elements, which are necessary for forming the locking connection can be easily formed on the drive motor surface. E.g., as the case may be, edges, grooves, or bosses, which have already been formed on the outer surface of the drive motor, can be used for receiving or for being engaged by the locking hooks. This permits to keep the manufacturing costs low.

It is advantageous when the adapter in its assembled condition abuts, regionwise, the power tool housing. Thereby, the adapter is additionally secured in its final position.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
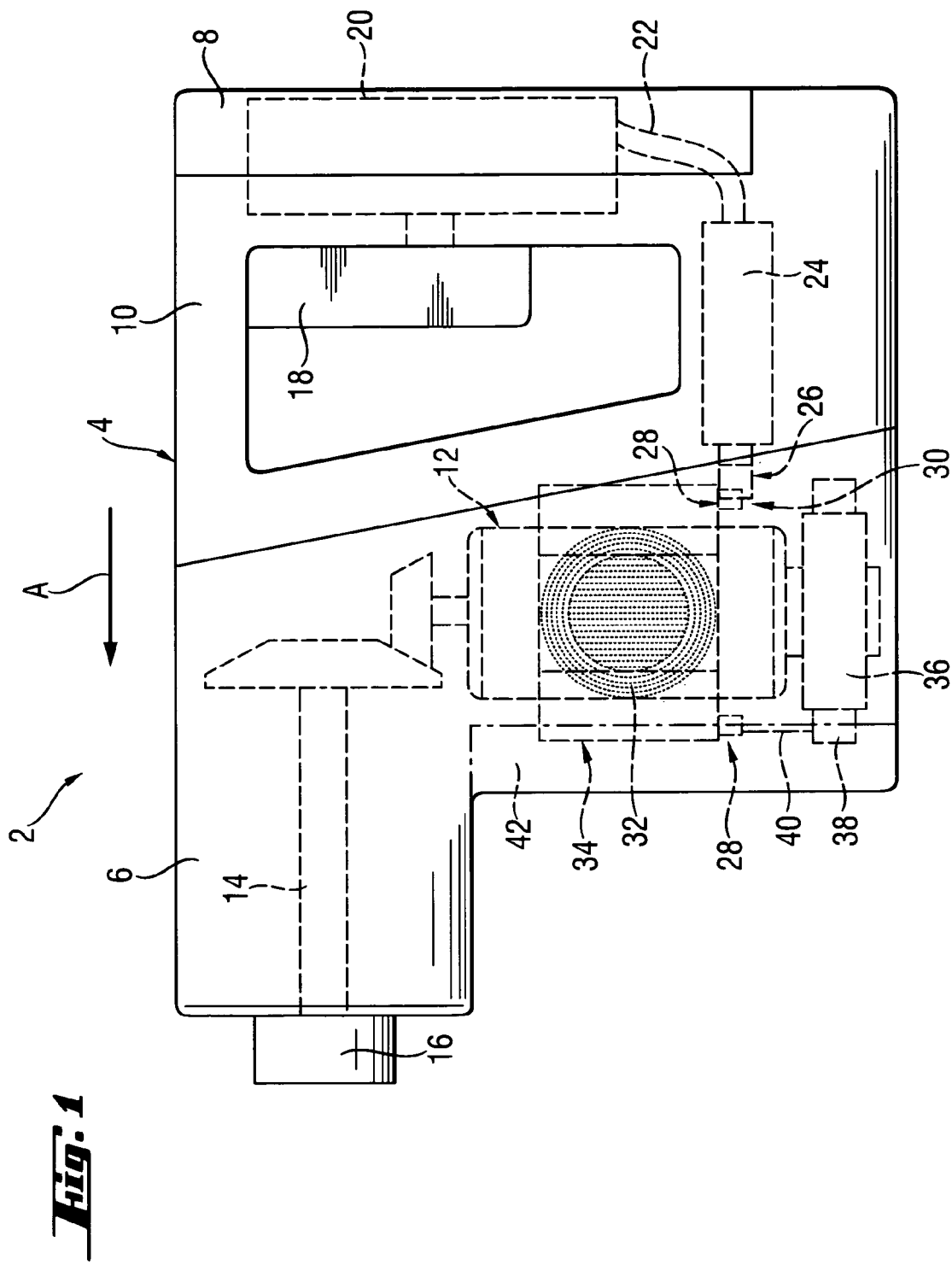
FIG. 1 a side view of a hand-held power tool with a brush holder extending in the operational direction of the power tool.

FIG. 1 shows a hand-held power tool 2 in form of a drilling tool and having a housing 4 formed essentially of a motor-transmission housing 6 and a handle housing 10 that is closed with a handle housing cover 8. Instead of the drilling tool, the present invention can be used with any electrically driven tool such as, e.g., screwdriver, chisel tool, saw, or grinding tool.

In the motor-transmission housing 6, a drive motor 12 is arranged. The drive motor 12 drives, via a tool spindle 14, a tool holder 16. The tool holder 16 is arranged at an end of the motor-transmission housing 6 facing in an operational direction A of the hand-held power tool 2.

In the handle housing 10, there is provided a switch 20 that is actuated by a push-button 18. The switch 20 is connected with a contact plug 24 by conductors 22. The contact plug 24 has plug contact means 26 that forms an electrical plug connection 30 with the counter contact means 28 of the drive motor 12. The electrical plug connection 30 provides for feeding current, in a manner not shown in the drawings, to a stator winding 32, shown with dot lines, of the stator 34 of the drive motor 12.

The drive motor 12 further includes a brush holder 36 at opposite sides of which there are provided, respectively, two carbon guides 38 extending parallel to the operation direction A. The carbon guides 38 are also connected electrically with the stator winding 32 by a connection 40 shown with a dash line.

A power tool 2, which is shown in FIG. 1, represents a certain type of a power tool that belongs to a series of power tools that includes a plurality of differently equipped power tool types. Other types of power tools may need space for additional equipment features, such as, e.g., dust suction means (not shown). This space is designated in FIG. 1 with a reference numeral 42 and is provided in the motor-transmission housing 6. The space 42 is limited in FIG. 1 with a dash-dot line. As shown in FIG. 1, the drive motor 12 partially extends into space 42. Therefore, it is not possible to locate the above-mentioned equipment in the embodiment of the power tool 2 which is shown in FIG. 1.

Figure 2:
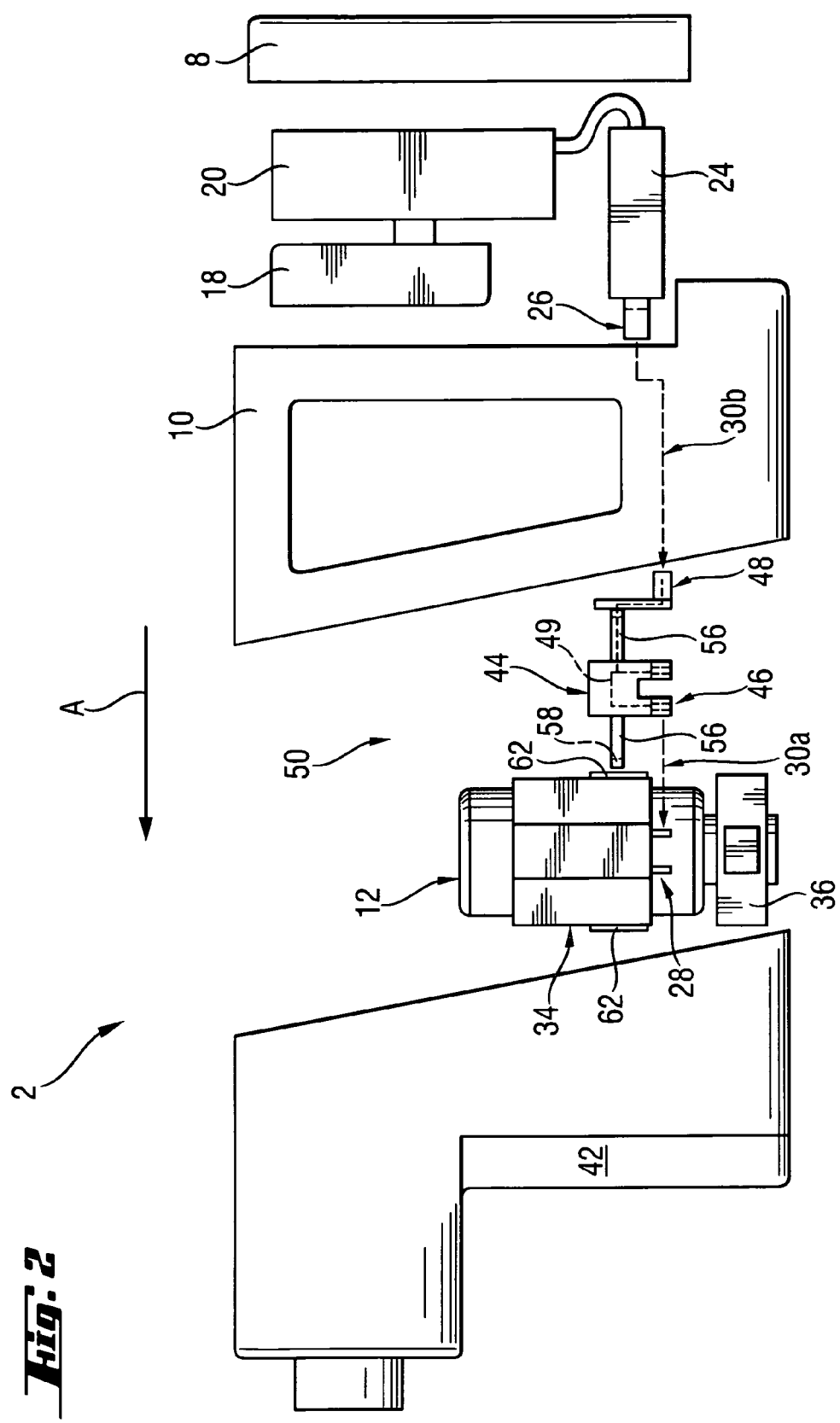
FIG. 2 an exploded side view of the power tool with the brush holder extending transverse to the operational direction.

FIG. 2 shows an embodiment or type of the hand-held power tool 2 in which the space 42 is used for additional equipment and is not available for arrangement therein of any part of the drive motor 12. Therefore, in order to be able to use a constructively similar drive motor 12, the drive motor is pivoted about its drive axis by 90°, so that the carbon guides 38 and the greater width of the stator 34 extend transverse to the operational direction A. In this embodiment, the same switch 20 with the contact plug 24 is used. The switch 20 with the contact plug 24 are arranged in the handle housing 10 in the same manner as in the embodiment shown in FIG. 1.

In order to be able to establish an electrical connection between the drive motor 12 and the contact plug 24 of the switch 20 at the changed position of the drive motor 12, there is provided an adapter 44. The adapter 44 has a plug connecter 46 that can be mechanically and electrically connected with the counter-plug contact means 28, and a counter-plug connecter 48 that can be mechanically and electrically connected with plug contact means 26 of the contact plug 24 of the switch 20. The plug connecter 46 is electrically connected with the counter-plug connecter 48 by conductor means 49 provided in the adapter 44.

Figure 3:
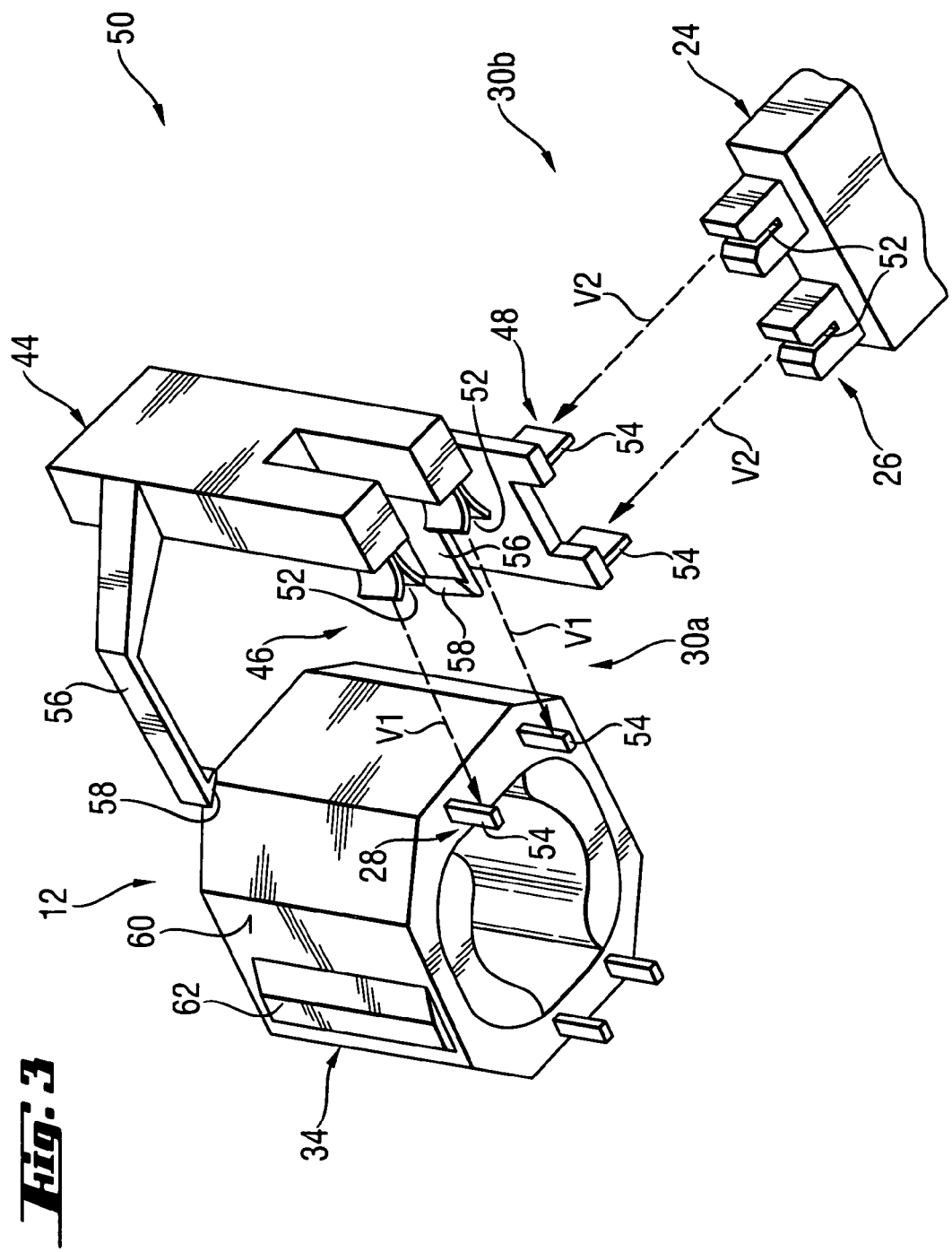
FIG. 3 an exploded perspective view of a motor-switch arrangement according to the present invention of the power tool shown in FIG. 2.

The switch 20 with the contact plug 24, the drive motor 12, and the adapter 44 form together a motor-switch arrangement which is designated with reference numeral 50 and shown in detail in FIG. 3.

As shown in FIG. 3, both the plug contact means 26 of the contact plug 24 and the plug connecter 46 of the adapter 44 each form, respectively, two slots 52 for receiving flat plug contacts. In case of the plug connecter 46, the slots 52 are formed, respectively, of two contact lamellas each which project from the adapter 44 in form of letter Y. In case of the plug contact means 26, the slots 52 are formed by slotted plastic elements on which electrical contacts, not shown, are provided. The slots 52 are formed complementary to flat plugs elements 54 which are provided on the counter-plug connecter 48 of the adapter 44 and on the counter-plug contact means 28 of the drive motor 12. As further shown in FIG. 3, during assembly, the plug connecter 46 of the adapter 44 is pushed over the counter-plug contact means 28 of the drive motor 12 along a first connection direction V1 in order to establish a first plug connection 30a, as it is particularly shown in FIG. 4. The flat plug elements 54 of the counter-plug contact means 28 is receive din the complementary formed and arranged slots 52 of the plug connecter 46.

Figure 4:
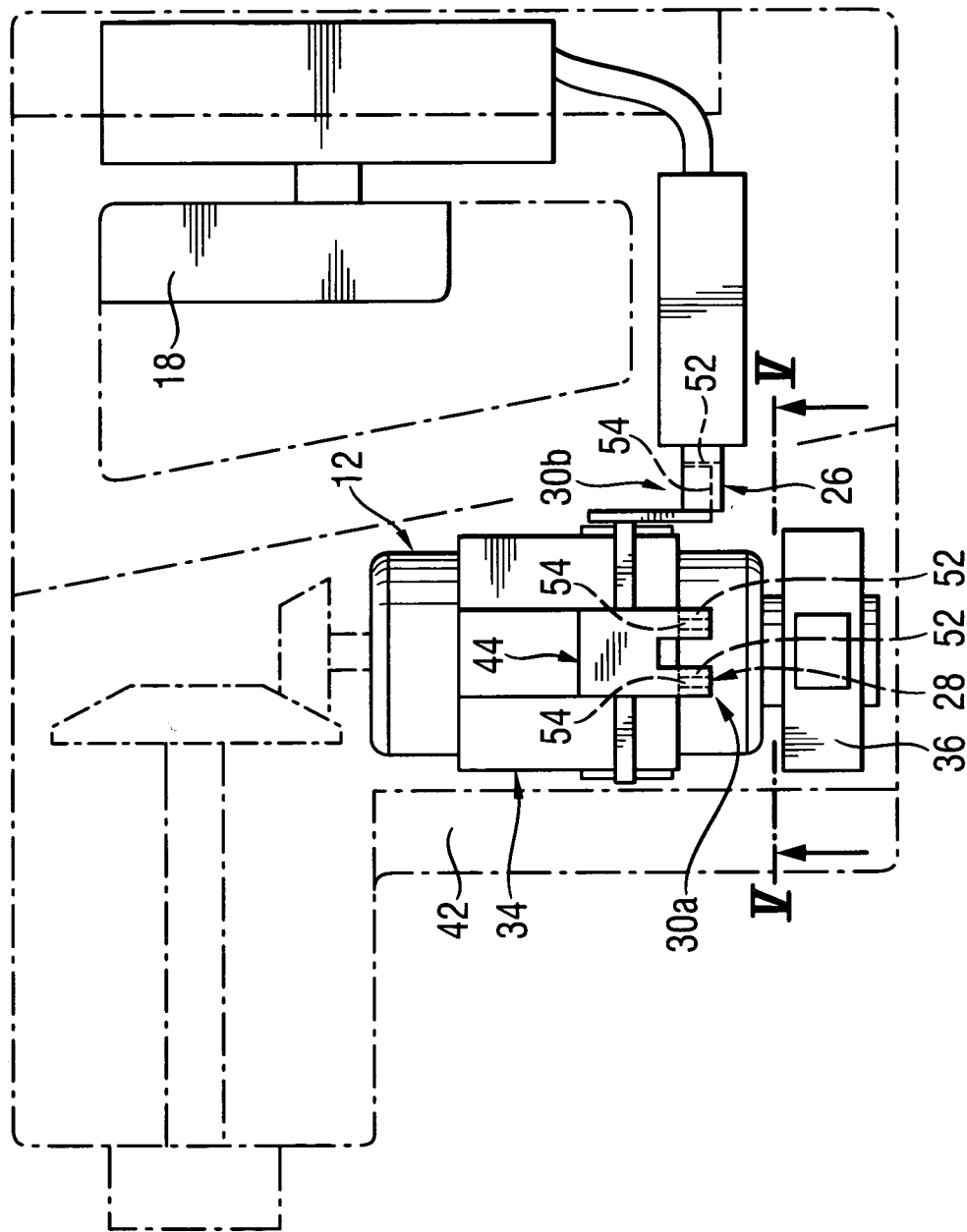
FIG. 4 a schematic side view of the motor-switch arrangement shown in FIG. 3 in the assembled condition.

As also shown in FIG. 3, during assembly, the plug contact means 26 of the contact plug 24 is pushed, along a second connection direction V2 that extends transverse to the first connection direction V1, over the counter-plug connecter 48 of the adapter 44 in order to establish a second plug connection 30b, as particularly shown in FIG. 4. The flat plug elements 54 of the counter-plug connecter 48 are received in the complementary and arranged slots 52 of the plug contact means 26.

Figure 5:
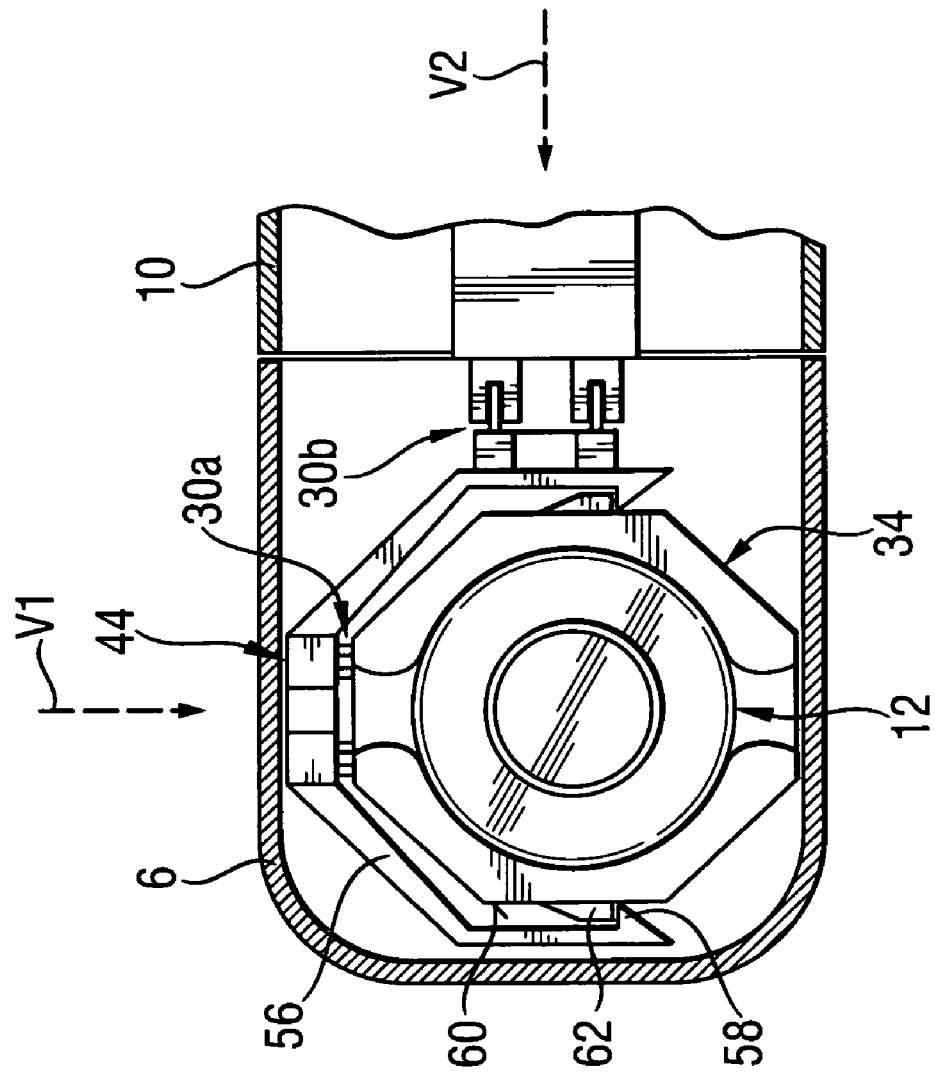
FIG. 5 a cross-sectional view along line V—V in FIG. 4.

As particularly shown in FIGS. 3–5, the adapter 44 has two, oppositely located spring arms 56 at free end of which locking hooks 58 are formed On the oppositely located side of the outer surface 60 of the stator 34, there are formed somewhat ramp-shaped bosses which formed rims that engage respective locking hooks 58 from behind and serve, thus, as locking receptacles. In this way, the locking hooks 58 and the locking receptacles 52 form a locking connection that provides for a preliminary mounting of the adapter 44 on the drive motor 12.

For mounting of the motor-switch arrangement 50 in the housing 4, the adapter 44 can, thus, upon establishing of the first plug connection 30*a*, be clipped simultaneously along the first connection direction V1 over the stator 34. Then, the drive motor 12, together with the clipped-on adapter 44, is so inserted in the motor-transmission housing 6 that the adapter 44, as shown in FIG. 5, at least adjoins the motor-transmission housing 6 on the side of the first plug connection 30*a* in order to additionally ensure the retention of the first plug connection 30*a*. The mutually perpendicular connection directions V1 and V2 provide for establishing, problem-free, the second plug connection 30*b* along the second connection direction V2 upon attachment of the handle housing 10 to the motor-transmission housing 6.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A motor-switch arrangement (50) for a hand-held power tool (2), comprising:
    a drive motor (12);
    a switch (20) for actuating the drive motor (12);
    a contact plug (24) electrically connected with the switch (20) and having plug contact means (26) connectable with counter-plug contact means (28) provided on the drive motor (12) for establishing an electrical plug connection (30) between the contact plug (24) and the drive motor (12); and
    an adapter (44) arranged between the contact plug (24) and the drive motor (12) and having a plug connecter (46) cooperating with the counter-plug contact means (28) of the drive motor (12) for establishing a first electrical plug connection (30*a*) of the adapter (44), and a counter-plug connecter (48) electrically connected with the plug connecter (46) and cooperating with the plug contact means (26) of the contact plug (24) for establishing a second electrical plug connection (30*b*) of the adapter (44).

2. A motor-switch arrangement according to claim 1, wherein both the first electrical plug connection (30*a*) and the second electrical plug connection (30*b*) each has two flat plug elements (54) and two complementary flat plug element-receiving slots (52).

3. A motor-switch arrangement according to claim 1, wherein the first electrical plug connection (30*a*) and the second electrical plug connection (30*b*) define, respectively, mutually perpendicular first connection direction (V1) and second connection direction (V2).

4. A motor-switch arrangement according to claim 1, wherein the adapter (44) comprises locking means for fixedly securing the adapter (44) on a stator (34) of the drive motor (12).

5. A motor-switch arrangement according to claim 4, wherein the fixedly securing means comprises locking means.

6. A motor-switch arrangement according to claim 5, wherein the locking means comprises pivotal locking hook means (58) provided on the adapter (44) and locking receptacles (62) provided on an outer surface (60) of the stator (34) and in which the locking hooks means (58) engages.

7. A hand-held power tool, comprising:
    a housing (4);
    a tool spindle (14) located in the housing (4); and
    a motor-switch arrangement (50) including:
        a drive motor (12) for driving the spindle (8), a switch (20) for actuating the drive motor (12), a contact plug (24) electrically connected with the switch (20) and having plug contact means (26) connectable with counter-plug contact means (28) provided on the drive motor (12) for establishing an electrical plug connection (30) between the contact plug (24) and the drive motor (12); and
        an adapter (44) arranged between the contact plug (24) and the drive motor (12) and mountable, at least regionwise on the housing (4), the adapter (4) having a plug connecter (46) cooperating with the counter-plug contact means (28) of the drive motor (12) for establishing a first electrical plug connection (30*a*) of the adapter (44), and a counter-plug connecter (48) electrically connected with the plug connecter (46) and cooperating with the plug contact means (26) of the contact plug (24) for establishing a second electrical plug connection (30*b*) of the adapter (44) with the contact plug (24).

\* \* \* \* \*